(12) United States Patent
Kaplan et al.

(10) Patent No.: US 8,341,316 B2
(45) Date of Patent: Dec. 25, 2012

(54) METHOD AND APPARATUS FOR CONTROLLING A TRANSLATION LOOKASIDE BUFFER

(75) Inventors: David Kaplan, Austin, TX (US); Christopher D. Bryant, Austin, TX (US); Stephen P. Thompson, Longmont, CO (US)

(73) Assignee: Advanced Micro Devices, Inc., Austin, TX (US)

( * ) Notice: Subject to any disclaimer, the term of this patent is extended or adjusted under 35 U.S.C. 154(b) by 296 days.

(21) Appl. No.: 12/948,677

(22) Filed: Nov. 17, 2010

(65) Prior Publication Data

US 2012/0124325 A1    May 17, 2012

(51) Int. Cl.
*G06F 3/00* (2006.01)
*G06F 9/26* (2006.01)
(52) U.S. Cl. ............... 710/55; 710/5; 711/207; 719/314
(58) Field of Classification Search .................. 710/5–7, 710/52–55; 711/203–207, 125; 719/314
See application file for complete search history.

(56) References Cited

U.S. PATENT DOCUMENTS

| | | | | |
|---|---|---|---|---|
| 5,771,366 A * | 6/1998 | Bjorksten et al. | ............. | 712/217 |
| 6,976,260 B1 * | 12/2005 | Ault et al. | ............. | 719/314 |
| 7,568,088 B1 * | 7/2009 | Favor et al. | ............. | 712/228 |
| 7,627,723 B1 * | 12/2009 | Buck et al. | ............. | 711/155 |
| 7,814,281 B2 * | 10/2010 | Day et al. | ............. | 711/147 |
| 8,086,806 B2 * | 12/2011 | Nyland et al. | ............. | 711/154 |
| 8,266,394 B2 * | 9/2012 | Michael et al. | ............. | 711/155 |
| 2002/0199067 A1 * | 12/2002 | Patel et al. | ............. | 711/145 |
| 2006/0090168 A1 * | 4/2006 | Ogasawara et al. | ............. | 719/320 |
| 2009/0249356 A1 * | 10/2009 | He et al. | ............. | 719/314 |
| 2012/0124296 A1 * | 5/2012 | Bryant | ............. | 711/136 |

* cited by examiner

*Primary Examiner* — Christopher B Shin
(74) *Attorney, Agent, or Firm* — Williams, Morgan & Amerson (57) ABSTRACT

A method and apparatus are provided for controlling a translation lookaside buffer in connection with the execution of an atomic instruction. The method comprises identifying load instructions within a plurality of instructions to be executed, and placing the identified load instructions in a queue prior to execution. An atomic instruction identified in the queue is prevented from executing until the atomic instruction is the oldest instruction in the queue. The apparatus comprises a queue and a translation lookaside buffer. The queue is adapted to: identify an atomic instruction within a plurality of instructions to be executed; prevent execution of the atomic instruction until it is the oldest instruction in the queue; and send a virtual address corresponding to the atomic instruction and an atomic load signal in response to determining that the atomic instruction is the oldest instruction in the queue. The translation lookaside buffer is adapted for maintaining at least one virtual to physical address translation, and is adapted to force a miss in the translation lookaside buffer in response to receiving the atomic load signal.

24 Claims, 4 Drawing Sheets

METHOD AND APPARATUS FOR CONTROLLING A TRANSLATION LOOKASIDE BUFFER

BACKGROUND

1. Field of the Invention

Embodiments of this invention relate generally to computers, and, more particularly, to the processing and maintenance of out-of-order memory operations.

2. Description of Related Art

In computing, virtual memory is a memory management technique developed for multitasking kernels. This technique virtualizes a computer architecture's various hardware memory devices (such as RAM modules and disk storage drives), allowing a program to be designed as though there is only one hardware memory device and this "virtual" device acts like a RAM module.

Programs operating on a computer system generally use memory operations to move data to and from memory. The term "memory operation" refers to an operation that specifies a transfer of data between a processor and memory (or cache). Load memory operations specify a transfer of data memory to the processor, and store memory operations specify a transfer of data from the processor to memory. In a computer system that employs virtual memory, each program may be written using virtual memory addresses that do not necessarily correspond to the actual physical address at which the data is stored or from where it is retrieved. Rather, the computer system performs a translation between the virtual and physical memory addresses when it is instructed to store data to memory or to load data from memory.

The translation process can be problematic in at least one situation where an instruction to be executed by the computer system is broken down into a series of operations. For example, some instructions, such as load-op-stores, which may be called atomic instructions, may be broken into multiple operations, such as Load, Execute operation, Execute operation, and Store. Some examples of this type of instruction in the x86 architecture is ADD [mem], eax, CMPXCHG or the like. In this type of instruction, the Load and Store operations are separated in time from each other (by at least the Execute operations), but should occur from and to the same location in memory to ensure proper operation. However, since this type of instruction is executed in multiple steps, it is possible for the translation process to vary between the time of the load operation and the time of the store operation. If the translation varies, then the data resulting from the execute operations will not be stored in the same location from which the original data was loaded, leading to unreliable operation of the computer system.

Accordingly, to avoid this translation issue, processors have included logic and control structures that do not permit, or otherwise avoid, the explained behavior in situations where, in an atomic instruction, the load operations works properly with respect to the translation process, but the store operation faults with respect to the translation. In the past such a situation has been identified as an illegal operation.

SUMMARY OF EMBODIMENTS OF THE INVENTION

In one aspect of the present invention, a method is provided. The method comprises identifying load instructions within a plurality of instructions to be executed, and placing the identified load instructions in a queue prior to execution. An atomic instruction identified in the queue is prevented from executing until the atomic instruction is the oldest instruction in the queue.

In another aspect of the present invention, a computer readable program storage device encoded with at least one instruction that, when executed by a computer, performs a method is provided. The method comprises identifying load instructions within a plurality of instructions to be executed, and placing the identified load instructions in a queue prior to execution. An atomic instruction identified in the queue is prevented from executing until the atomic instruction is the oldest instruction in the queue.

In another aspect of the present invention, an apparatus is provided. The apparatus comprises a queue and a translation lookaside buffer. The queue is adapted to identify an atomic instruction within a plurality of instructions to be executed; prevent execution of the atomic instruction until it is the oldest instruction in the queue; and send a virtual address corresponding to the atomic instruction and an atomic load signal in response to determining that the atomic instruction is the oldest instruction in the queue. The translation lookaside buffer is adapted for maintaining at least one virtual to physical address translation, and is adapted to force a miss in the translation lookaside buffer in response to receiving the atomic load signal.

In another aspect of the present invention, a computer readable storage device encoded with data that, when implemented in a manufacturing facility, adapts the manufacturing facility to create an apparatus is provided. The apparatus comprises a queue and a translation lookaside buffer. The queue is adapted to: identify an atomic instruction within a plurality of instructions to be executed; prevent execution of the atomic instruction until it is the oldest instruction in the queue; and send a virtual address corresponding to the atomic instruction and an atomic load signal in response to determining that the atomic instruction is the oldest instruction in the queue.

The translation lookaside buffer is adapted for maintaining at least one virtual to physical address translation, and is adapted to force a miss in the translation lookaside buffer in response to receiving the atomic load signal.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
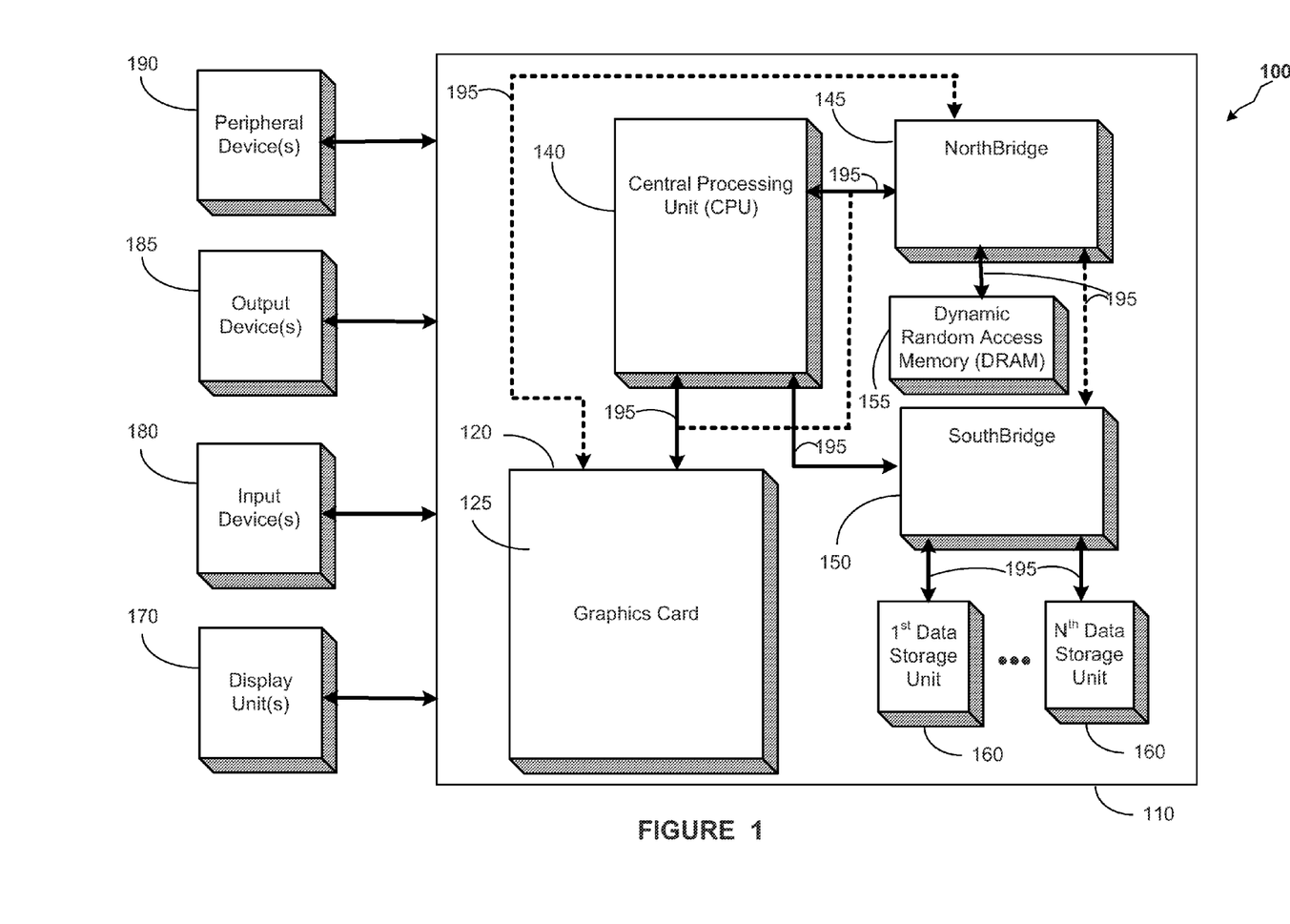
FIG. 1 schematically illustrates a simplified block diagram of a computer system according to one embodiment.

Turning now to FIG. 1, a block diagram of an exemplary computer system 100, in accordance with an embodiment of the present invention, is illustrated. In various embodiments the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110, which may be a computer motherboard, system-on-a-chip, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, the computer system 100 runs an operating system such as Linux, Unix, Windows, Mac OS, or the like.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, the CPU 140, the northbridge 145, and the GPU 125 may be included in a single package or as part of a single die or "chips". Alternative embodiments, which may alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185, and/or peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary aspects of the computer system 100 are not described herein, such exemplary aspects may or may not be included in various embodiments without limiting the spirit and scope of the embodiments of the present invention as would be understood by one of skill in the art.

Figure 2:
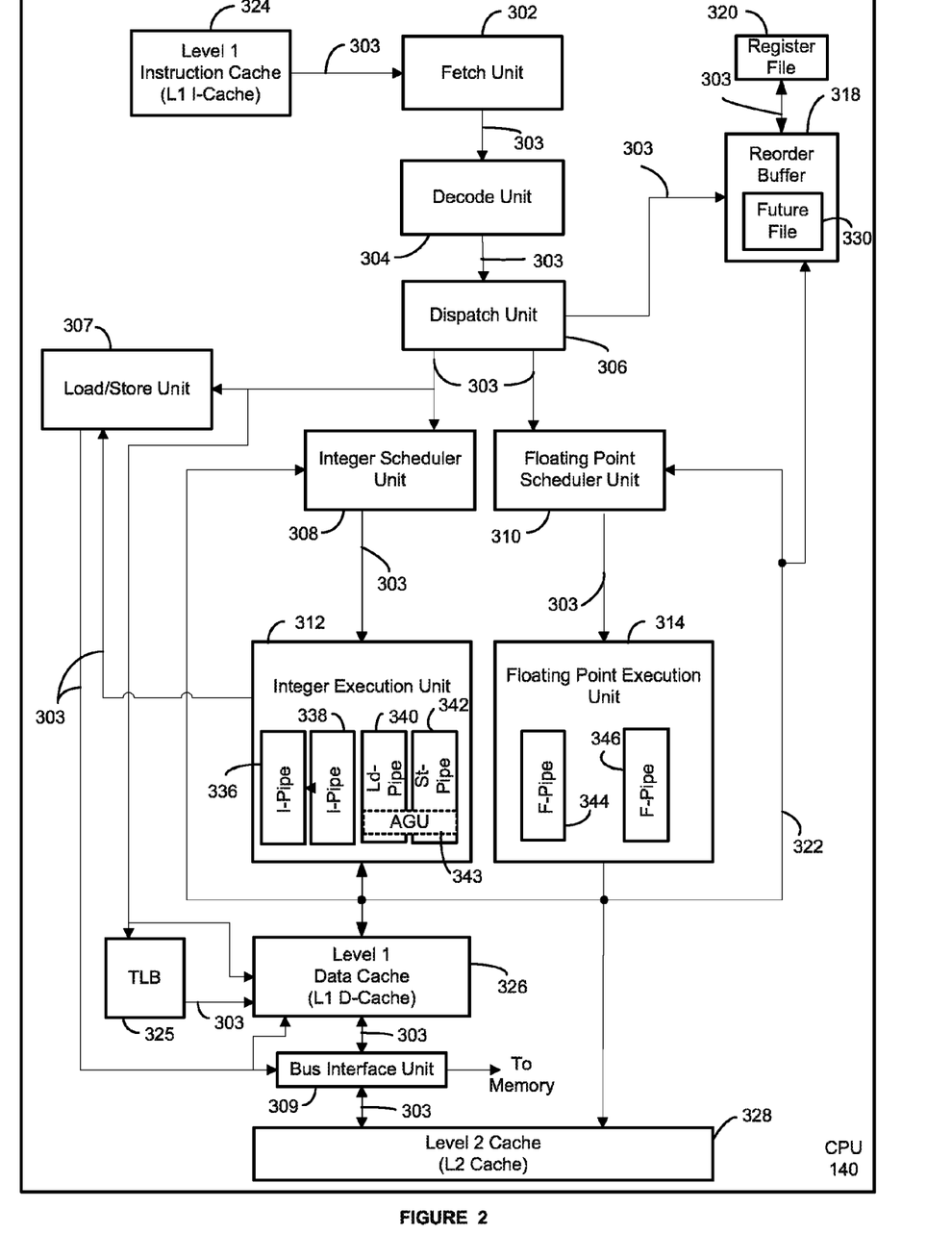
FIG. 2 illustrates an exemplary detailed representation of one embodiment of the central processing unit provided in FIG. 1 according to one embodiment.

Turning now to FIG. 2, a diagram of an exemplary implementation of the CPU 140, in accordance with an embodiment of the present invention, is illustrated. The CPU 140 includes a fetch unit 302, a decode unit 304, a dispatch unit 306, a load/store unit 307, an integer scheduler unit 308 a floating-point scheduler unit 310, an integer execution unit 312, a floating-point execution unit 314, a reorder buffer 318, and a register file 320. In one or more embodiments, the various components of the CPU 140 may be operatively, electrically and/or physically connected or linked with a bus 303 or more than one bus 303. The CPU 140 may also include a result bus 322, which couples the integer execution unit 312 and the floating-point execution unit 314 with the reorder buffer 318, the integer scheduler unit 308, and the floating-point scheduling unit 310.

The CPU 140 may also include a Level 1 Instruction Cache (L1 I-Cache) 324 for storing instructions, a Level 1 Data Cache (L1 D-Cache 326) for storing data and a Level 2 Cache (L2 Cache) 328 for storing data and instructions. As shown, in one embodiment, the L1 D-Cache 326 may be coupled to the integer execution unit 312 via the result bus 322, thereby enabling the integer execution unit 312 to request data from the L1 D-Cache 326. In some cases, the integer execution unit 312 may request data not contained in the L1 D-Cache 326. Where requested data is not located in the L1 D-Cache 326, the requested data may be retrieved from a higher-level cache (such as the L2 cache 328) or memory 155 (shown in FIG. 1) via the bus interface unit 309.

In one embodiment, the L2 cache 328 may provide data to the L1 I-Cache 324 and L1 D-Cache 326. In different embodiments, the L1 I-Cache 324, L1 D-Cache 326, and the L2 Cache 328 may be may be implemented in a fully-associated, set-associative, or direct mapped configuration. In one embodiment, the L2 Cache 328 may be larger than the L1 I-Cache 324 or the L1 D-Cache 326. In alternate embodiments, the L1 I-Cache 324, the L1 D-Cache 326 and/or the L2 cache 328 may be separate from or external to the CPU 140 (e.g., located on the motherboard). It should be noted that embodiments of the present invention are not limited by the sizes and configuration of the L1 I-Cache 324, the L1 D-Cache 326, and the L2 cache 328. Referring still to FIG. 2, the CPU 140 may support out-of-order instruction execution.

Accordingly, the reorder buffer 318 may be used to maintain the original program sequence for register read and write operations, to implement register renaming, and to allow for speculative instruction execution and branch misprediction recovery. The reorder buffer 318 may be implemented in a first-in-first-out (FIFO) configuration in which operations move to the bottom of the reorder buffer 318 as they are validated, making room for new entries at the top of the reorder buffer 318. The reorder buffer 318 may retire an operation once an operation completes execution and any data or control speculation performed on any operations, up to and including that operation in program order, is verified. In the event that any data or control speculation performed on an operation is found to be incorrect (e.g., a branch prediction is found to be incorrect), the results of speculatively-executed instructions along the mispredicted path may be invalidated within the reorder buffer 318. It is noted that a particular instruction is speculatively executed if it is executed prior to instructions that precede the particular instruction in program order.

In one embodiment, the reorder buffer 318 may also include a future file 330. The future file 330 may include a plurality of storage locations. Each storage location may be assigned to an architectural register of the CPU 140. For example, in the x86 architecture, there are eight 32-bit architectural registers (e.g., Extended Accumulator Register (EAX), Extended Base Register (EBX), Extended Count Register (ECX), Extended Data Register (EDX), Extended Base Pointer Register (EBP), Extended Source Index Register (ESI), Extended Destination Index Register (EDI) and Extended Stack Pointer Register (ESP)). Each storage location may be used to store speculative register states (i.e., the most recent value produced for a given architectural register by any instruction). Non-speculative register states may be stored in the register file 320. When register results stored within the future file 330 are no longer speculative, the results may be copied from the future file 330 to the register file 320.

The storing of non-speculative instruction results into the register file 320 and freeing the corresponding storage locations within reorder buffer 318 is referred to as retiring the instructions. In the event of a branch mis-prediction or discovery of an incorrect speculatively-executed instruction, the contents of the register file 320 may be copied to the future file 330 to replace any erroneous values created by the execution of these instructions.

Referring still to FIG. 2, the fetch unit 302 may be coupled to the L1 I-cache 324 (or a higher memory subsystem, such as the L2 cache 328 or external memory 155 (shown in FIG. 1)). The fetch unit 302 may fetch instructions from the L1 I-Cache for the CPU 140 to process. The fetch unit 302 may contain a program counter, which holds the address in the L1 I-Cache 324 (or higher memory subsystem) of the next instruction to be executed by the CPU 140. In one embodiment, the instructions fetched from the L1 I-cache 324 may be complex instruction set computing (CISC) instructions selected from a complex instruction set, such as the x86 instruction set implemented by processors conforming to the x86 processor architecture. Once the instruction has been fetched, the instruction may be forwarded to the decode unit 304.

The decode unit 304 may decode the instruction and determine the opcode of the instruction, the source and destination operands for the instruction, and a displacement value (if the instruction is a load or store) specified by the encoding of the instruction. The source and destination operands may be values in registers or in memory locations. A source operand may also be a constant value specified by immediate data specified in the instruction encoding. Values for source operands located in registers may be requested by the decode unit 304 from the reorder buffer 318. The reorder buffer 318 may respond to the request by providing either the value of the register operand or an operand tag corresponding to the register operand for each source operand. The reorder buffer 318 may access the future file 330 to obtain values for register operands. If a register operand value is available within the future file 330, the future file 330 may return the register operand value to the reorder buffer 318. On the other hand, if the register operand value is not available within the future file 330, the future file 330 may return an operand tag corresponding to the register operand value. The reorder buffer 318 may then provide either the operand value (if the value is ready) or the corresponding operand tag (if the value is not ready) for each source register operand to the decode unit 304. The reorder buffer 318 may also provide the decode unit 304 with a result tag associated with the destination operand of the instruction if the destination operand is a value to be stored in a register. In this case, the reorder buffer 318 may also store the result tag within a storage location reserved for the destination register within the future file 330. As instructions (or instructionerations, as will be discussed below) are completed by the execution units 312, 314, each of the execution units 312, 314 may broadcast the result of the instruction and the result tag associated with the result on the result bus 322. When each of the execution units 312, 314 produces the result and drives the result and the associated result tag on the result bus 322, the reorder buffer 318 may determine if the result tag matches any tags stored within. If a match occurs, the reorder buffer 318 may store the result within the storage location allocated to the appropriate register within the future file 330.

After the decode unit 304 decodes the instruction, the decode unit 304 may forward the instruction to the dispatch unit 306. The dispatch unit 306 may determine if an instruction is forwarded to either the integer scheduler unit 308 or the floating-point scheduler unit 310. For example, if an opcode for an instruction indicates that the instruction is an integerbased operation, the dispatch unit 306 may forward the instruction to the integer scheduler unit 308.

Conversely, if the opcode indicates that the instruction is a floating-point operation, the dispatch unit 306 may forward the instruction to the floating-point scheduler unit 310.

In one embodiment, the dispatch unit 306 may also forward load instructions ("loads") and store instructions ("stores") to the load/store unit 307. The load/store unit 307 may store the loads and stores in various queues and buffers (as will be discussed below in reference to FIG. 3) to facilitate in maintaining the order of memory operations by keeping in-flight memory operations (i.e., operations that have completed but have not yet retired) in program order. The load/store unit 307 may also maintain a queue (e.g., the load ordering queue (LOQ) 404, shown in FIG. 3) that stores out-of-order loads (i.e., a load that executes out-of-order with respect to other loads). The load/store unit 307 may also be configured to receive snoop operations (e.g., stores) from other cores of the main structure 110 (e.g., the GPU 125, the northbridge 145, the southbridge 150, or another CPU 140). In doing so, the load/store unit 307 may be able to detect snoop hits or snoop misses on any of the out-of-order loads. Upon detecting a snoop hit on an out-of-order load, it may be determined that a memory ordering violation has occurred. As a result, an error signal may be asserted, which may cause the CPU 140 to flush the pipeline and re-execute the out-of-order loads stored in the LOQ 404.

Once an instruction is ready for execution, the instruction is forwarded from the appropriate scheduler unit 308, 310 to the appropriate execution unit 312, 314. Instructions from the integer scheduler unit 308 are forwarded to the integer execution unit 312. In one embodiment, integer execution unit 312 includes two integer execution pipelines 336, 338, a load execution pipeline 340 and a store execution pipeline 342, although alternate embodiments may add to or subtract from the set of integer execution pipelines and the load and store execution pipelines. Arithmetic and logical instructions may be forwarded to either one of the two integer execution pipelines 336, 338, where the instructions are executed and the results of the arithmetic or logical operation are broadcast to the reorder buffer 318 and the scheduler units 308, 310 via the result bus 322. Memory instructions, such as loads and stores, may be forwarded, respectively, to the load execution pipeline 340 and store execution pipeline 342, where the virtual address for the load or store is generated. The load execution pipeline 340 and the store execution pipeline 342 may each include an address generation unit (AGU) 343, which generates the virtual address for its respective load or store. Once the virtual address is generated, the L1 D-Cache 326 may be accessed to either read the data for a load or determine if the store instruction is ready to complete and have its data written to the appropriate memory location for a store (assuming the load or store hits the cache). If the load or store misses the L1 D-Cache 326, then the data may be written to or read from the L2 cache 328 or memory 155 (shown in FIG. 1) via the bus interface unit 309. In one embodiment, the L1 D-Cache 326, the L2 cache 328 or the memory 155 may be accessed using a physical address. Therefore, the CPU 140 may also include a translation lookaside buffer (TLB) 325 to translate virtual addresses into physical addresses.

Figure 3:
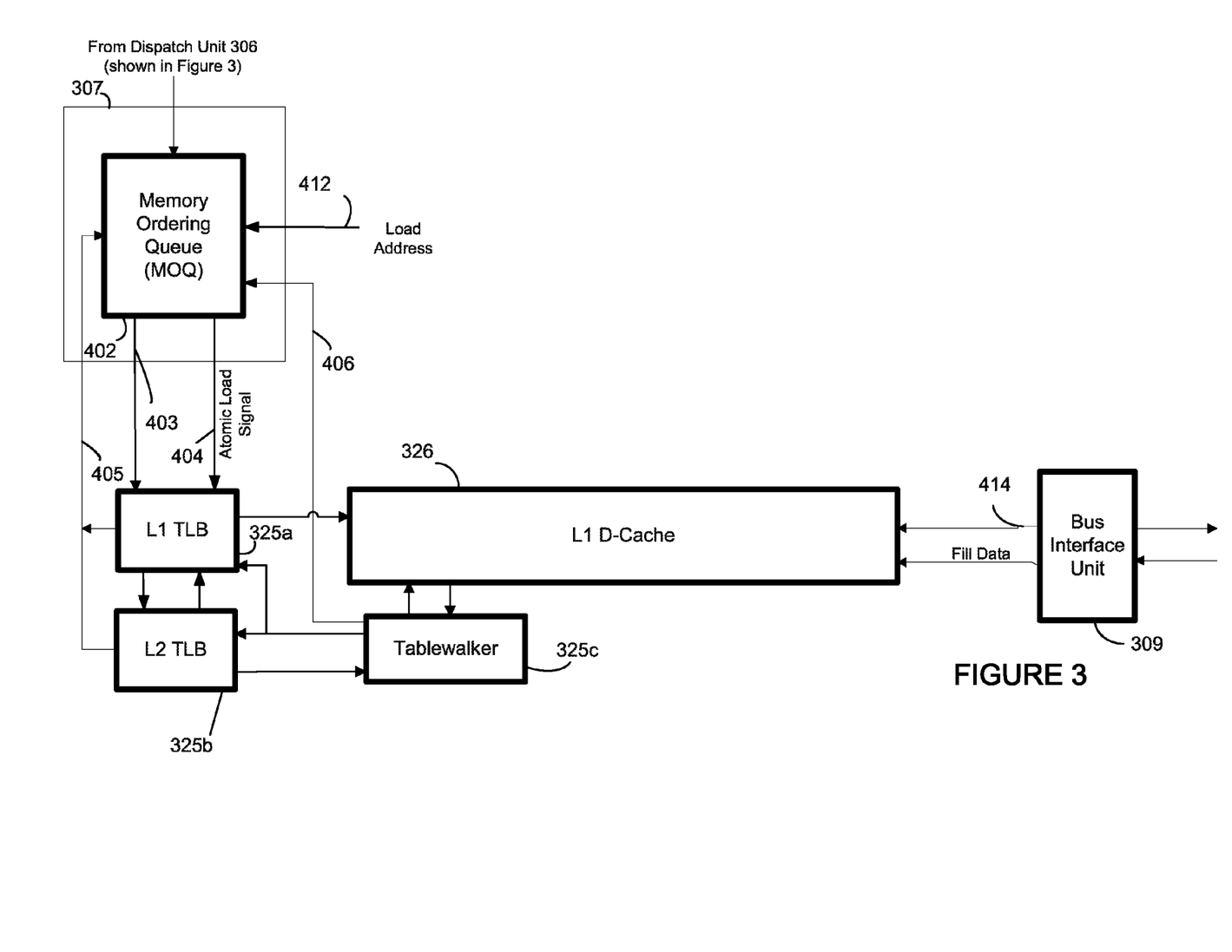
FIG. 3 illustrates an exemplary detailed representation of one embodiment of a load/store unit coupled to a data cache and a translation lookaside buffer according to one embodiment of the present invention.

Turning now to FIG. 3, a block diagram of the load/store unit 307 coupled with the L1 D-Cache 326 and the TLB 325, in accordance with an embodiment of the present invention, is illustrated. Those skilled in the art will appreciate that the TLB 325 generally operates to translate virtual addresses to physical addresses, and may be arranged in multiple levels, such as an L1 TLB 325a and an L2 TLB 325b. Thus, if a virtual address (load or store) misses in the L1 TLB 325a, then a miss signal along with the address may be sent to the L2 TLB 325b. The L2 TLB 325b may determine if the desired translation is located therein. If the address hits in the L2 TLB 325b, then the translation is retrieved from the L2 TLB 325b and placed in the L1 TLB 325a. On the other hand, if the address misses in the L2 TLB 325b, then the L2 TLB 325b may send a miss signal along with the load address to a Tablewalker 325c, which will retrieve the desired translation from memory, such as the L1-D-Cache 326, the L2 cache 328, the memory 155, or the like and place the translation retrieved from memory into both the L1 TLB 325a and the L2 TLB 325b.

As shown, the load/store unit 307 includes a memory ordering queue (MOQ) 402, a load ordering queue (LOQ) (not shown), and a miss address buffer (MAB) (not shown). The MOQ 402 may store loads dispatched from the dispatch unit 306 (shown in FIG. 3) in program order. The LOQ may store loads that are determined to be executing out-of-order with respect to other loads. The MAB 406 may store load addresses for loads that resulted in a cache miss (i.e., miss addresses). The load/store unit 307 may also include other components not shown (e.g., a queue for storing stores and various other load/store handling circuitry).

The MOQ 402 may be organized as an ordered array of 1 to N storage entries. Each MOQ 402 may be implemented in a FIFO configuration in which loads move to the bottom of the queue, making room for new entries at the top of the queue. New loads are loaded in at the top and shift toward the bottom as new loads are loaded into the MOQ 402. Therefore, newer or "younger" loads are stored toward the top of the queue, while "older" loads are stored toward the bottom of the queue. The loads may remain in the MOQ 402 until they have executed. Those skilled in the art will appreciate that the load instructions stored in the MOQ 402 may be executed out-of-order.

The load/store unit 307 and MOQ 402 may receive a virtual load address via a bus 412. The virtual load address may be generated from the AGU 343 located in the load pipe 340 of the integer execution unit 312 when a load instruction is ready to be executed. Generally, the MOQ 402 will identify the load instruction contained therein that corresponds to the received load address, and then, depending on the type of load instruction, the MOQ 402 may either allow the load instruction to be executed, or in the case of an atomic load instruction, it may delay the execution until the atomic load instruction is the oldest load instruction in the MOQ 402.

Assuming that the identified load instruction is not an atomic instruction, the virtual load address is delivered over a bus 403 to the TLB 325, where a translation will be performed. The translated address may then be used to access the identified memory location so that the load instruction may be executed. As discussed above, the translation process performed by the TLB 325 may occur in a single step if a hit occurs in the L1 TLB 325 a, 2-steps if a miss occurs in the L1 TLB 325a and a hit occurs in the L2 TLB 325b, or even 3-steps if a miss occurs in both the L1 TLB 325a and the L2 TLB 325b such that the tablewalker 325c must retrieve the translation from memory. Misses and hits that occur in the L1 TLB 325a and the L2 TLB 325b are communicated to the MOQ 402 via a bus 405 so as to instruct the MOQ 402 to restart the execution of the load instruction once the desired translation is available.

The operation of the MOQ 402 with respect to atomic instructions varies from the forgoing description. Generally, the MOQ 402 operates to prevent an atomic instruction from being executed until it is the oldest instruction located therein.

The MOQ 402 is capable of determining whether a particular load instruction is the oldest load instruction contained therein using any of a variety of techniques well known to those of ordinary skill in the art. In one such technique, when a load address is delivered over the bus 412, indicating that the corresponding load instruction is ready to be executed, the MOQ 402 may be searched for the corresponding load. Once the corresponding load is identified, the MOQ 402 searches for entries below the identified load. If load instructions are found below the identified load, then it may be determined that the identified load is not the oldest load in the MOQ 402. If the MOQ 402 determines that the identified load is an atomic instruction and that it is not the oldest load, then the load is not permitted to be executed. As discussed more fully below, delaying execution of the atomic instruction until it is the oldest load in the MOQ 402 substantially reduces the likelihood that the load and store portions of the atomic instruction, such as a load-op-store instruction, will obtain different translation information from the TLB 325.

If the MOQ 402 receives a virtual load address that corresponds to an atomic instruction that is the oldest load instruction in the MOQ 402, then the MOQ 402 permits the load to go forward, and delivers the virtual address to the L1 TLB 325a via the bus 403. However, the MOQ 402 also delivers an atomic load signal to the L1 TLB 325a via a bus 404 that forces a miss in the L1 TLB 325 regardless of whether the translation is actually present in the L1 TLB 325a. Additionally, the L1 TLB 325a will at some point remove the translation therefrom, if the proper translation was, in fact, actually present in the L1 TLB 325a. Those skilled in the art will appreciate that the translation may be removed immediately, or at some later time. Additionally, the L1 TLB 325a also sends a miss signal to the MOQ 402 and forwards the virtual address to the L2 TLB 325b. If a hit occurs in the L2 TLB 325b, then the translation is retrieved from the L2 TLB 325b and placed in the L1 TLB 325a and the hit signal is communicated to the MOQ 402 via the bus 405, which causes the MOQ 402 to attempt to execute the identified atomic load by providing the virtual address over the bus 403, but this time does not deliver a signal to the L1 TLB 325a via the bus 404 that forces a miss. Alternatively, if a miss occurs in both the L1 TLB 325a and the L2 TLB 325b, then the tablewalker 325c retrieve the translation from memory and place the translation in both the L1 TLB 325a and the L2 TLB 325b. Once the tablewalker 325c completes the process of retrieving the desired translation from memory and storing it in the L1 TLB 325a and the L2 TLB 325b, it sends a signal to the MOQ 402 via a bus 406 so as to instruct the MOQ 402 to restart the execution of the load instruction once the desired translation is available. The MOQ 402 responds by attempting to execute the identified atomic load by providing the virtual address over the bus 403, and again does not deliver the atomic load signal to the L1 TLB 325a via the bus 404 so as not to forces a miss in the L1 TLB 325a.

Figure 4:
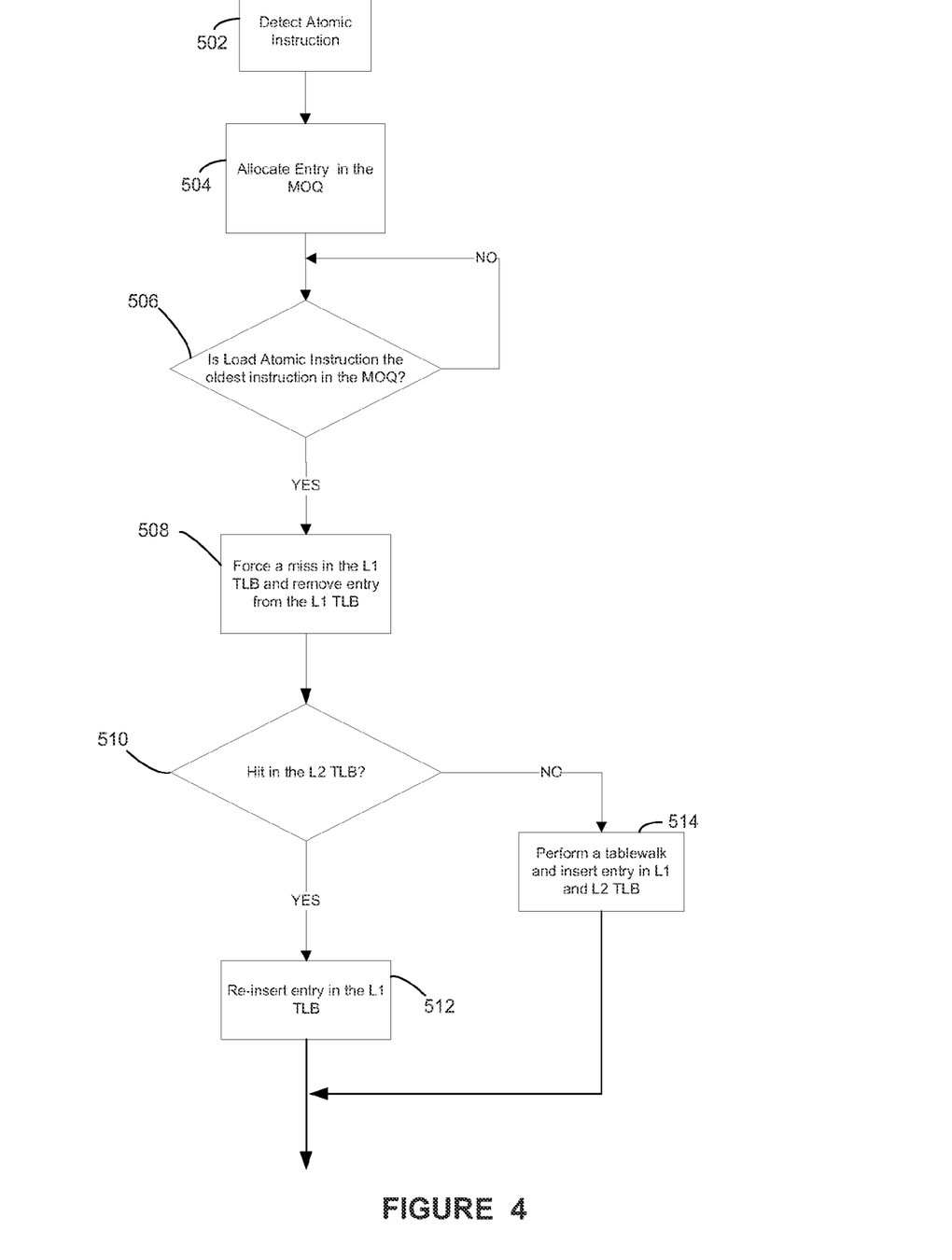
FIG. 4 illustrates a flowchart for operations of the load/store unit during execution of a load-op-store type instruction according to one embodiment of the present invention.

Turning now to FIG. 4, in accordance with one or more embodiments of the invention, a flowchart illustrating operations of the load/store unit 307 during execution of an atomic instruction is shown. The operation begins at step 502, where an atomic instruction has been identified by the decode unit 304 and delivered by the dispatch unit 306 to the Load/Store Unit 307. At step 504, an entry in the MOQ 402 is identified as corresponding to the load portion of the atomic instruction. Thereafter, to reduce the chances of the TLB 325 identifying different translations for the load and store portions of the atomic instruction, the load instruction is not permitted to proceed until it is the oldest instruction in the MOQ 402. As discussed in greater detail above, the MOQ 402 is able to identify all load instructions in the MOQ 402 that are older than the load portion of the atomic instruction and thus the MOQ 402 determines when the load portion of the atomic instruction becomes the oldest load instruction. When the load portion of the atomic instruction becomes the oldest load instruction, control transfers to block 508 where the L1 TLB 325a is forced to miss, and if the proper entry is actually contained in the L1 TLB 325a, it is removed.

The miss in the L1 TLB 325a results in a request being delivered to the L2 TLB 325b, which inspects its contents to determine if the desired translation is present in the L2 TLB 325b. If a hit occurs in the L2 TLB 325b, then control transfers to block 512 where the information from the L2 TLB 325b is sent to and inserted in the L1 TLB 325a. On the other hand if there is a miss in the L2 TLB, then control transfers to block 514 where the desired information is retrieved from memory, such as the L2 Cache 326, memory 155 or the like and inserted into both the L1 TLB 325a and the L2 TLB 325b. After either blocks 512 or 514, the load portion of the atomic instruction is allowed to move forward and retrieve the desired information from memory, such as the L2 Cache 326, memory 155 or the like.

Those skilled in the art will appreciate that for the embodiment described herein the entries in the L2 TLB 325b can only be replaced by the tablewalker 325c. Moreover, in the embodiment described herein, operation of the tablewalker 325c is limited to instructions that are being executed non-speculatively. In this manner, since the load operation in the atomic instruction is the oldest instruction in the MOQ 402, then no other load or store operation is available to intervene between the load and store operations within the atomic instruction. Thus, since no intervening loads or stores are possible, both the load and store portions of the atomic instruction will use the same translation information from the TLB 325.

Additionally, those skilled in the art will appreciate that aspects of the instant invention may find application with respect to a variety of types of instructions, including Load-op-store instructions and locked sequences. For example, the invention may find application in Load-op-store instructions that include a variety of intermediate operations, such as RCL, BT, BTC, etc.

Likewise, the invention may find application in locked sequences, such as CMPXCHG, CMPXCHG16B, locked BTC/BTS, etc. Further, the invention may also find application in a variety of internal microde sequences, such as setting the busy bit in a task descriptor.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units 160, RAMs 130 & 155, compact discs, DVDs, solid state storage and the like). In one embodiment, the GDSII data (or other similar data) may be adapted to configure a manufacturing facility (e.g,. through the use of mask works) to create devices capable of embodying various aspects of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices. For example, in one embodiment, processor 140 may be created using the GDSII data (or other similar data).

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method, comprising:
    identifying load instructions within a plurality of instructions to be executed;
    placing the identified load instructions in a queue prior to execution;
    identifying an atomic instruction in the queue; and
    preventing execution of the atomic instruction until the atomic instruction is the oldest instruction in the queue.

2. A method, as set forth in claim 1, further comprising:
    delivering a virtual address associated with the atomic instruction and an atomic load signal to a translation lookaside buffer containing at least one virtual to physical address translation in response to determining that the atomic instruction is the oldest instruction in the queue; and
    forcing a miss in the translation lookaside buffer in response to receiving the atomic load signal.

3. A method, as set forth in claim 2, wherein the translation lookaside buffer includes a first level and a second level translation lookaside buffer and wherein forcing a miss in the translation lookaside buffer further comprises forcing a miss in the first level translation lookaside buffer in response to receiving the atomic load signal.

4. A method, as set forth in claim 3, further comprising inspecting the second level translation lookaside buffer for the virtual to physical address translation corresponding to the atomic instruction in response to the forced miss in the first level translation lookaside buffer.

5. A method, as set forth in claim 4, further comprising sending the virtual to physical address translation corresponding to the atomic instruction from the second level translation lookaside buffer to the first level translation lookaside buffer in response to detecting the virtual to physical address translation corresponding to the atomic instruction in the second level translation lookaside buffer.

6. A method, as set forth in claim 5, further comprising the second level translation lookaside buffer sending a miss signal in response to the detecting that the virtual to physical address translation corresponding to the atomic instruction is absent from the second level translation lookaside buffer, and wherein a tablewalker is adapted to retrieve the virtual to physical address translation corresponding to the atomic instruction from memory in response to receiving the miss signal from the second level translation lookaside buffer.

7. A method, as set forth in claim 6, further comprising inserting the virtual to physical address translation corresponding to the atomic instruction retrieved from memory into the first and second level translation lookaside buffers.

8. A method, as set forth in claim 2, further comprising removing the virtual to physical address translation that corresponds to the atomic instruction from the first level translation lookaside buffer in response to receiving the atomic load signal.

9. A computer readable program storage device encoded with at least one instruction that, when executed by a computer, performs a method, comprising:
    identifying load instructions within a plurality of instructions to be executed;
    placing the identified load instructions in a queue prior to execution;
    identifying an atomic instruction in the queue; and
    preventing execution of the atomic instruction until the atomic instruction is the oldest instruction in the queue.

10. A computer readable program storage device, as set forth in claim 9, the method further comprising:
    delivering a virtual address associated with the atomic instruction and an atomic load signal to a translation lookaside buffer containing at least one virtual to physical address translation in response to determining that the atomic instruction is the oldest instruction in the queue; and
    forcing a miss in the translation lookaside buffer in response to receiving the atomic load signal.

11. A computer readable program storage device, as set forth in claim 10, wherein the translation lookaside buffer includes a first level and a second level translation lookaside buffer and wherein the method further comprises forcing a miss in the translation lookaside buffer further comprises forcing a miss in the first level translation lookaside buffer in response to receiving the atomic load signal.

12. A computer readable program storage device, as set forth in claim 11, the method further comprising inspecting the second level translation lookaside buffer for the virtual to physical address translation corresponding to the atomic instruction in response to the forced miss in the first level translation lookaside buffer.

13. A computer readable program storage device, as set forth in claim 12, the method further comprising sending the virtual to physical address translation corresponding to the atomic instruction from the second level translation lookaside buffer to the first level translation lookaside buffer in response to detecting the virtual to physical address translation corresponding to the atomic instruction in the second level translation lookaside buffer.

14. A computer readable program storage device, as set forth in claim 13, the method further comprising the second level translation lookaside buffer sending a miss signal in response to the detecting that the virtual to physical address translation corresponding to the atomic instruction is absent from the second level translation lookaside buffer, and wherein a tablewalker is adapted to retrieve the virtual to physical address translation corresponding to the atomic instruction from memory in response to receiving the miss signal from the second level translation lookaside buffer.

15. A computer readable program storage device, as set forth in claim 14, the method further comprising inserting the virtual to physical address translation corresponding to the atomic instruction retrieved from memory into the first and second level translation lookaside buffers.

16. A computer readable program storage device, as set forth in claim 10, the method further comprising removing the virtual to physical address translation that corresponds to the atomic instruction from the first level translation lookaside buffer in response to receiving the atomic load signal.

17. An apparatus, comprising:
a queue adapted to:
identify an atomic instruction within a plurality of load instructions to be executed;
prevent execution of the atomic instruction until it is the oldest instruction in the queue; and
send a virtual address corresponding to the atomic instruction and an atomic load signal in response to determining that the atomic instruction is the oldest instruction in the queue; and
a translation lookaside buffer adapted for maintaining at least one virtual to physical address translation, the translation lookaside buffer being adapted to force a miss in the translation lookaside buffer in response to receiving the atomic load signal.

18. An apparatus, as set forth in claim 17, wherein the translation lookaside buffer includes a first level and a second level translation lookaside buffer and wherein the forced miss occurs in the first level translation lookaside buffer in response to receiving the atomic load signal.

19. An apparatus, as set forth in claim 18, further comprising the second level translation lookaside buffer being adapted to inspect for the virtual to physical address translation corresponding to the atomic instruction in response to the forced miss in the first level translation lookaside buffer.

20. An apparatus, as set forth in claim 19, further comprising the second level translation lookaside buffer being adapted to send the virtual to physical address translation corresponding to the atomic instruction to the first level translation lookaside buffer in response to detecting the virtual to physical address translation corresponding to the atomic instruction in the second level translation lookaside buffer.

21. A method, as set forth in claim 20, wherein the second level translation lookaside buffer is adapted to send a miss signal in response to the detecting that the virtual to physical address translation corresponding to the atomic instruction is absent from the second level translation lookaside buffer, and further comprising a tablewalker being adapted to retrieve the virtual to physical address translation corresponding to the atomic instruction from memory in response to receiving the miss signal from the second level translation lookaside buffer.

22. An apparatus, as set forth in claim 21, further comprising the first and second level translation lookaside buffers being adapted to insert the virtual to physical address translation corresponding to the atomic instruction retrieved from memory into the first and second level translation lookaside buffers.

23. A method, as set forth in claim 17, further comprising the first level translation lookaside buffer being adapted to remove the virtual to physical address translation that corresponds to the atomic instruction from the first level translation lookaside buffer in response to receiving the atomic load signal.

24. A computer readable storage device encoded with data that, when implemented in a manufacturing facility, adapts the manufacturing facility to create an apparatus, comprising:
a queue adapted to:
identify an atomic instruction within a plurality of load instructions to be executed;
prevent execution of the atomic instruction until it is the oldest instruction in the queue; and
send a virtual address corresponding to the atomic instruction and an atomic load signal in response to determining that the atomic instruction is the oldest instruction in the queue; and
a translation lookaside buffer adapted for maintaining at least one virtual to physical address translation, the translation lookaside buffer being adapted to force a miss in the translation lookaside buffer in response to receiving the atomic load signal.

* * * * *